US009628992B2

United States Patent
Dimatteo, III et al.

(10) Patent No.: US 9,628,992 B2
(45) Date of Patent: Apr. 18, 2017

(54) WIFI ACCESS MANAGEMENT SYSTEM AND METHODS OF OPERATION THEREOF

(71) Applicant: WYFI, Inc., Pittsburg, CA (US)

(72) Inventors: Lawrence Anthony Dimatteo, III, Pittsburg, CA (US); Matthew Allen Clemenson, San Francisco, CA (US)

(73) Assignee: WYFI, Inc., Pittsburg, CA (US)

( * ) Notice: Subject to any disclaimer, the term of this patent is extended or adjusted under 35 U.S.C. 154(b) by 104 days.

(21) Appl. No.: 14/815,735

(22) Filed: Jul. 31, 2015

(65) Prior Publication Data

US 2017/0034703 A1 Feb. 2, 2017

(51) Int. Cl.
*H04W 12/08* (2009.01)
*H04W 48/08* (2009.01)
*H04L 29/08* (2006.01)
*H04W 76/06* (2009.01)
*H04L 12/24* (2006.01)

(52) U.S. Cl.
CPC ............. *H04W 12/08* (2013.01); *H04L 41/22* (2013.01); *H04L 67/306* (2013.01); *H04W 48/08* (2013.01); *H04W 76/068* (2013.01)

(58) Field of Classification Search
CPC ... H04W 12/08; H04W 48/08; H04W 76/068; H04L 67/306; H04L 41/22
USPC ........................................ 455/410–411, 41.2
See application file for complete search history.

(56) References Cited

U.S. PATENT DOCUMENTS

| 7,263,076 B1 * | 8/2007 | Leibovitz ................ H04L 63/10 370/310 |
| 8,199,699 B2 * | 6/2012 | Woo .................... H04L 41/0806 370/254 |
| 8,844,012 B1 | 9/2014 | Chan et al. |

(Continued)

FOREIGN PATENT DOCUMENTS

WO  WO 2014/096954  6/2014

OTHER PUBLICATIONS

Hotspot Manager—Android Apps on Google Play, https://play.google.com/store/apps/details?id=com.etustudio.android.hotspotmanager&hl=en, Nov. 19, 2013.

(Continued)

*Primary Examiner* — Sharad Rampuria
(74) *Attorney, Agent, or Firm* — Levine Bagade Han LLP

(57) ABSTRACT

A WiFi access management system and methods of operation are disclosed. In one embodiment, a method comprises receiving, at a server, a wireless access profile and a wireless access list from a securing client device; transmitting an invitation message to an accessing client device associated with the wireless access list; receiving, at the server, a request from the accessing client device to connect to a wireless network associated with the wireless access profile in response to the invitation message; determining, using a processing unit of the server, an operating system of the accessing client device; creating, using the processing unit, a customized configuration file associated with the wireless network based on the operating system of the accessing client device, the wireless access profile, and the wireless access list; and transmitting the customized configuration file using a second encryption protocol to the accessing client device through the server communication unit.

17 Claims, 17 Drawing Sheets

(56) References Cited

U.S. PATENT DOCUMENTS

| | | | | |
|---|---|---|---|---|
| 9,008,114 B2* | 4/2015 | Maguire | ............... | H04W 8/00 370/464 |
| 9,215,005 B2* | 12/2015 | Friedl | ............... | G06Q 20/145 |
| 2011/0093913 A1* | 4/2011 | Wohlert | ............... | H04L 63/101 726/1 |
| 2012/0110640 A1 | 5/2012 | Donelson et al. | | |
| 2012/0110643 A1 | 5/2012 | Schmidt et al. | | |
| 2012/0266217 A1 | 10/2012 | Kaal et al. | | |
| 2013/0058274 A1* | 3/2013 | Scherzer | ............... | H04W 12/08 370/328 |
| 2013/0080520 A1* | 3/2013 | Kiukkonen | ............ | G06Q 50/01 709/204 |
| 2013/0198383 A1* | 8/2013 | Tseng | ............... | H04L 63/102 709/225 |
| 2013/0252636 A1 | 9/2013 | Chang et al. | | |
| 2013/0301627 A1 | 11/2013 | Chen et al. | | |
| 2014/0026192 A1 | 1/2014 | Gatewood et al. | | |
| 2014/0071970 A1 | 3/2014 | Velasco | | |
| 2014/0137206 A1 | 5/2014 | Hansmann et al. | | |

OTHER PUBLICATIONS

Hotspotio—Android Apps on Google Play, https://play.google.com/store/apps/details?id=com.hotspotio&hl=en, May 6, 2014.

InstaWifi—Android Apps on Google Play, ttps://play.google.com/store/apps/details?id=net.jessechen.instawifi&hl=en, May 21, 2015.

WiFi Manager—Android Apps on Google Play, https://play.google.com/store/apps/details?id=org.kman.WifiManager&hl=en, Apr. 14, 2015.

WiFi Map Pro—Passwords—Android Apps on Google Play, https://play.google.com/store/apps/details?id=io.wifimap.wifimap&hl=en, May 3, 2012.

\* cited by examiner

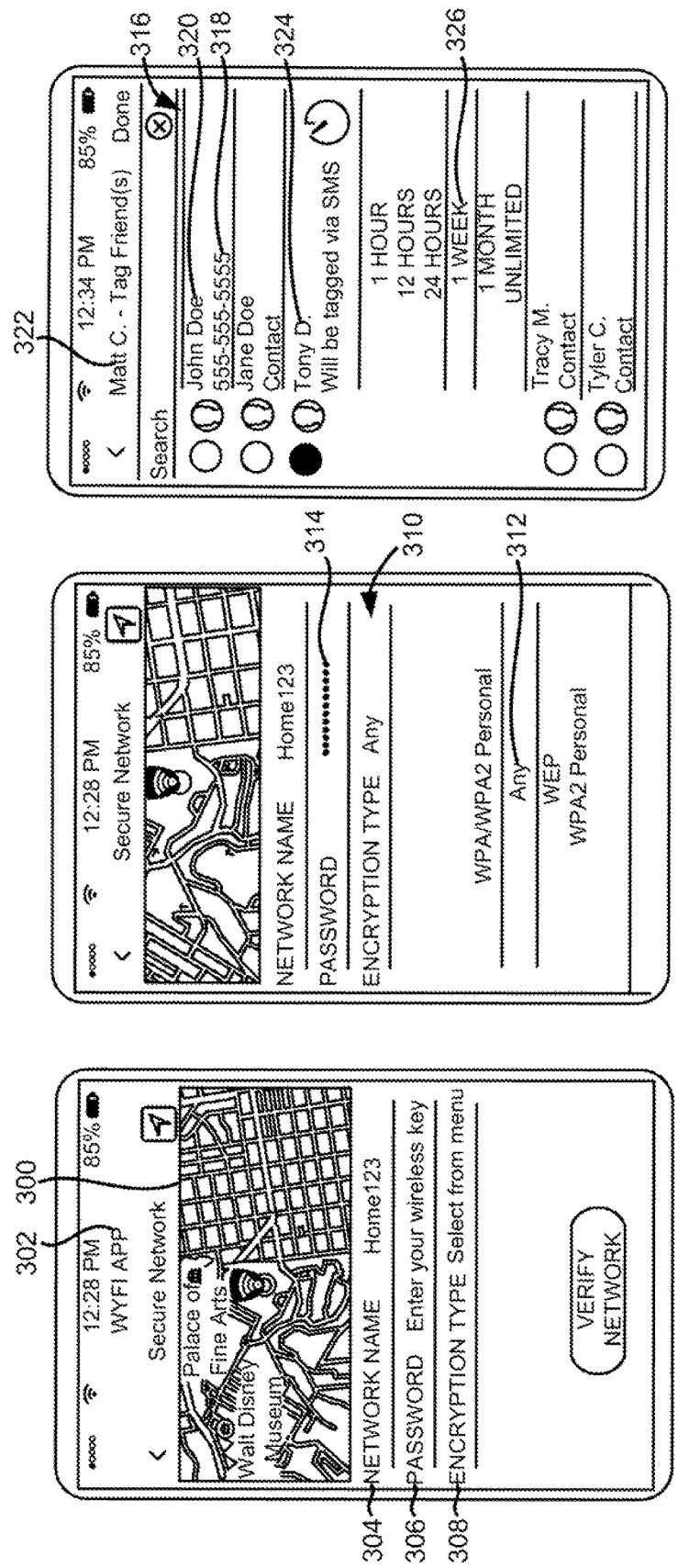

```
exports.addNetwork = function (req, res, next) {
    async.waterfall([
        function addNetwork(callback) { var network = new Network();
            network.user = req.user._id;
            network.usersCount = 1;
            network.encryptionType = req.body.encType;
            network.password = req.body.password;
            network.ssid = req.body.ssid;
            network.uuid = uuid.v4();
            network.displayName = req.body.displayName;
            network.organizationName = req.body.orgName;
            network.description = req.body.desc;

var lat = parseFloat(req.body.lat);
            var lng = parseFloat(req.body.lng);
            network.location = {type: 'Point' , coordinates: [lng, lat]};

if (req. body.removeAt) {
                    network.removeAt = new Date(req.body.removeAt * 1000);
            }
            else if (req.body.removeInterval) {
                    network.removeInterval = req.body.removeInterval;
            }
            network.save(function(err, network) {
                    callback(err, network);
            });

},
        function updateUser(network, callback) {
                req.user.update({$inc: {networksCount: 1}}, function(err) {
                        callback(null, network);
                });
        }, ], function(err, network) {
            if (err) return next(err);
            res.json({success: true, id: network.id});
    });
};
```

Labels: 308, 306, 304, 404

FIG. 5

```
var EncryptionType = Object.freeze({
    Any: 0,
    WEP: 1,
    WPA: 2,
    WPA2: 3,
});
var ProxyType = Object.Freeze({
    None: 0,
    Manual: 1,
    Automatic: 2,
});
var Network = new Schema({
    user: {type: mongoose.Schema.Types.ObjectId, ref:'user', required: true, index: true},
    usersCount: Number,
    joiners: [{type: mongoose.Schema.Types.ObjectId, ref:'user', index: true}],
    location: {type': {type: String, enum: "Point", default: "Point"}, coordinates: {type: [Number], default: [0, 0]}},
    // wifi: {
        autoJoin: {type:Boolean, 'default': true},
        encryptionType: {type: Number, 'default': EncryptionType. Any},
        hidden: {type: Boolean, 'default': false},
        isHotspot: {type: Boolean, 'default': false},
        password: {type: String, 'default': ''},
        proxyType: {type: Number, 'default': ProxyType.None},
        proxyUrl: String,
        proxyUsername: String,
        proxyPasswork: String, uuid: String,
        ssid: {type: String, required: true, index: true},
    // },
    removableDisallowed: {type: Boolean, 'default': false},
    hasRemovalPasscode: {type: Boolean, 'default': false},
    removeAt: Date,
    removeInterval: Number,
    displayName: String,
    organizationName: String,
    description: String,
    message: String,
    version {type: Number, 'default': 1},
});
```

FIG. 6

```
function writeNetworkConfig(invitation, network, callback) { var config = {};
    config.PayloadDisplayName = netwrok.displayName;
    config.PayloadIdentifier = "WYFI.cloud." + network.uuid;
    config.PayloadOrganization = network.organizationName;
    config.PayloadRemovalDisallowed =network.removableDisallowed;
    config.PayloadType = "Configuration";
    config.PayloadUUID = network.uuid;
    config.PayloadVersion = network.version;

if (invittation && invitation.removeAt) {
            config.RemovableDate = invitaion.removeAt.toISOString();
    }
    else if (invitation && invitation.removeInterval) {
            config.DurationUntilRemoval = invitation.removeInterval;
    }
    if (network.removeAt) {
            config.RemovalDate =network.removeAt.toISOString();
    }
    else if (network.removeInterval) {
            config.DurationUntilRemoval = network.removeInterval;
    }
    var content = {};
    content.AutoJoin = network.autoJoin;
    content.EncryptionType = encryptionTypeString(network.encryptionType);
    content.HIDDEN_NETWORK = network.hidden;
    content.IsHotspot = network.isHotspot;
    content.Password = network.password;
    content.PayloadDescription = "Configures Wi-Fi settings";
    content.PayloadDisplayName = network.displayName;
    content.PayloadIdentifier = "WYFI.cloud." + network.uuid + "com.apple.wifi.managed";
    content.payloadType = "com.apple.wifi.manages";
    content.PayloadUUID = network.uuid;
    content.PayloadVersion = network.version;
    content.ProxyType = proxyTypeString(network.proxyType);
    content.SSID_STR = network. ssid;
    config.PayloadContent = [content];

var fileName = network.uuid + '.mobileconfig';
    fs.writeFile(fileName, plist.build(config), function(err) {
            callback(err, fileName);
    });
},
```

FIG. 10

```
function encryptConfig(fileName, callback) {
        openssl.exec('smime', {sign: true, nodetach: true, in: fileName, signer: config.cert,
inkey: config.key, outform: 'der' }, function(err, buffer) {
                fs.unlinkSync(fileName);
                if (err) return callback(err);

var cipher = crypto.createCipheriv('aes128', keyBuf, ivBuf);
                var encrypted = cipher.update(buffer,'utf-8', 'base64') + cipher.final('base64');
                callback(null, encrypted);
        });
}
```

FIG. 11

```javascript
exports.networksNearby = function (req, res, next) {
    var limit = 100;
    var skip = 0;
    if (req.query.limit)
        limit = parseInt(req.query.limit);
    if (req.query.skip)
        skip = parseInt(req.query.skip);
    async.waterfall([
        function getNetworks(callback) {
            var lat = parseFloat(req.query.lat);
            var lng = parseFloat(req.query.lng);
            var point = {type: 'Point', coordinates: [lng, lat]};
            Network.aggregate()
                .near({near: point, maxDistance: 10000, distanceField: 'dis', spherical: true, limit: skip+limit+1})
                .limit(limit + 1)
                .skip(skip)
                .exec(function (err, networks, stats) {
                    if (err) return callback(err);
                    var hasMore = false;
                    if (networks.length > limit) {
                        hasMore = true;
                        networks.pop();
                    }
                    User.populate(networks, {path: 'user', select: 'username displayName hasProfile'}, function(err, networks) {
                        if (err) return callback(err);
                        callback(null, networks, hasMore);
                    });
                });
        },
        function(err, networks, hasMore) {
            if (err) return next(err);
            var results = [];
            networks.forEach(function(network) {
                results.push(network.toJson(network, req));
            });
            res.json({success:true, results:results, hasMore:hasMore});
        }
    ]);
};
```

FIG. 14

WIFI ACCESS MANAGEMENT SYSTEM AND METHODS OF OPERATION THEREOF

TECHNICAL FIELD

This disclosure relates generally to the field of wireless networks and, more specifically, to a WiFi access management system and methods of operation thereof.

BACKGROUND

Portable client devices such as smartphones, tablets, laptops, smartwatches, fitness monitors, and household internet of things (IoT) devices are providing increasing levels of functionality to support modern life. However, taking full advantage of the functionality provided by such devices often require that these devices be connected to a broadband connection. While cellular connections offer the advantage of a greater range of coverage, the cost of mobile broadband makes connecting such devices to a WiFi or wireless local area network (WLAN) the only real alternative for users seeking to stream multimedia content through such devices.

However, WiFi networks in residential and commercial environments often require users to enter a wireless key or password to access such a network. These wireless keys are either simple and insecure or complex and are easily forgotten and difficult to enter properly into the device. Moreover, a proprietor of a WiFi network might be required to change such keys or passwords periodically to prevent abuse or unauthorized usage.

The need to secure one's WiFi network must be balanced with the desire for the proprietor of such a network to share the network with friends, guests, or patrons. For example, a host of a vacation home might need to share the vacation home's WiFi network with guests of the vacation home for the duration of their stay. Additionally, a café owner might want to share the café's WiFi network with the café's regular patrons for a limited period of time. In these situations, granting such guests or customers with the WiFi network's actual wireless key or password might be difficult or undesirable.

Therefore, a solution is needed for a WiFi access management system to conveniently, securely and effectively control access to one's WiFi network for one's friends, guests, or patrons. In addition, such a solution should be compatible with different types of portable client devices. Moreover, such a solution should also allow third parties to take advantage of the system's benefits and integrate such benefits into their services or platforms.

SUMMARY

A WiFi access management system and methods of operation are disclosed. In certain embodiments, the WiFi access management system includes a securing client device having a client device processor, a client device memory, a client device communication unit, and a GPS receiver. In these embodiments, the client device processor can be programmed to create a wireless access profile to access or connect to a wireless network through a wireless networking device, such as a wireless router.

The client device processor can also be programmed to create a wireless access list based on contact information stored in the client device memory. The wireless access list can include a connection expiration period used to limit the connection of an accessing client device to the wireless network.

The securing client device can also determine current GPS coordinates of the securing client device using the GPS receiver concurrent with creating the wireless access profile. The client device communication unit can then securely transmit the wireless access profile, the wireless access list, the current GPS coordinates, or a combination thereof using a first encryption protocol to a server. The wireless access profile can include a network name or other identification (network ID) of the wireless network, a wireless key or password for accessing the wireless network, and an encryption type.

The server can have a server processor, a server memory, and a server communication unit. The server can receive the wireless access profile and the wireless access list from the securing client device. The server can then transmit an invitation message to an accessing client device associated with a contact included in the wireless access list through the server communication unit. The invitation message can contain a deferred deep link. The deferred deep link can direct the accessing client device to download an application.

The accessing client device can render an invitation graphical user interface on a display of the accessing client device. The accessing client device can transmit a request to connect to the wireless network to the server when the second client device receives a user input through the invitation graphical user interface. The accessing client device can also transmit to the server information concerning the operating system of the accessing client device.

The server can receive the request from the accessing client device in response to the invitation message. The request can be a request to access or connect to the wireless network. The server can also determine the operating system of the accessing client device based on information received from the accessing client device. The server can create a customized configuration file associated with the wireless network based on information concerning the operating system of the accessing client device and information from the wireless access profile and the wireless access list. The server can also create the customized configuration file using the connection expiration period in order to limit the amount of time the accessing client device can connect to the wireless network. The customized configuration file can be an XML file. For example, when the operating system of the accessing client device is an iOS operating system, the customized configuration file can be a mobileconfig file. The server can then transmit the customized configuration file using a second encryption protocol to the accessing client device through the server communication unit.

The accessing client device can install the customized configuration file on the accessing client device based on a user input from a user of the accessing client device. The accessing client device can store network configuration information associated with the wireless network in its client device memory once the customized configuration file is installed on the accessing client device. The accessing client device can connect to the wireless network automatically through the client device communication unit after installing the customized configuration file. The accessing client device can access or connect to the wireless network without displaying the wireless key on a display of the accessing client device.

A method of managing access to a WiFi network is also disclosed. In certain embodiments, the method involves creating, at a securing client device using a client device processor, a wireless access profile to access a wireless network through a wireless networking device. The method can also involve creating, at the securing client device, a wireless access list based on contact information stored in a client device memory of the securing client device. The method can further involve determining current GPS coordinates of the securing client device using a GPS receiver of the securing client device concurrent with creating the wireless access profile. The method can involve securely transmitting the current GPS coordinates, the wireless access profile, the wireless access list, or a combination thereof to the server using a first encryption protocol.

The method can involve receiving, at the server, the wireless access profile, the wireless access list, and the current GPS coordinates of the securing client device from the securing client device. The method can also involve transmitting an invitation message to an accessing client device associated with a contact included in the wireless access list through a server communication unit of the server. The invitation message can contain a deferred deep link. The method can involve directing the accessing client device to download an application compatible or supported by the operating system of the accessing client device. Alternatively, the method can involve directing the accessing client device to directly download an installable wireless configuration profile or a customized configuration file if supported by the operating system of the accessing client device.

The method can involve transmitting a request to connect to the wireless network to the server from the accessing client device in response to the invitation message. In another embodiment, the method can involve transmitting, from the accessing client device, a request to the server to connect to the wireless network when an invitation message has not been sent to the accessing client device. In this embodiment, the server can then transmit the request from the accessing client device to connect to the wireless network to the securing client device for approval from a user of the securing client device. The method can also involve transmitting information concerning the operating system of the accessing client device to the server.

The method can involve creating, using the server processor, a customized configuration file associated with the wireless network based on information concerning the operating system of the accessing client device and information from the wireless access profile and the wireless access list. The method can also involve creating the customize configuration file using a connection expiration period for limiting the amount of time the accessing client device can connect to the wireless network. The method can further include transmitting the customized configuration file using a second encryption protocol to the accessing client device.

The method can include installing, at the accessing client device, the customized configuration file. The method can further include storing, in a client device memory of the accessing client device, network configuration information associated with the wireless network when the customized configuration file is installed. The method can further include connecting to the wireless network automatically through the client communication unit of the accessing client device after installing the customized configuration file.

Another method of managing access to a WiFi network is disclosed. In certain embodiments, the method can involve receiving, at a server, a wireless access profile, a wireless access list, and current GPS coordinates of a securing client device desiring to connect to a wireless network. The method can also involve transmitting an invitation message to an accessing client device associated with a contact included in the wireless access list through a server communication unit of the server. The invitation message can contain a deferred deep link. The method can further involve directing the accessing client device to download an application for managing access to the wireless network.

The method can involve transmitting a request to connect to the wireless network to the server from the accessing client device in response to the invitation message. The method can also involve transmitting information concerning the operating system of the accessing client device to the server.

The method can further involve creating, using the server processor, a customized configuration file associated with the wireless network based on information concerning the operating system of the accessing client device and information from the wireless access profile, and the wireless access list. The method can also involve creating the customized configuration file using a connection expiration period for limiting the amount of time the accessing client device can connect to the wireless network. The method can further include transmitting the customized configuration file using a second encryption protocol to the accessing client device.

The method can include installing, at the accessing client device, the customized configuration file. The method can further include storing, in a client device memory of the accessing client device, network configuration information associated with the wireless network when the customized configuration file is installed. The method can further include connecting to the wireless network automatically through the client communication unit of the accessing client device after installing the customized configuration file.

The methods, devices, or systems disclosed herein may be implemented in a variety of different ways. Certain embodiments have other steps or elements in addition to or in place of those mentioned above. The steps or elements will become apparent to those skilled in the art from the accompanying drawings or from the detailed description that follows.

BRIEF DESCRIPTION OF THE DRAWINGS

FIG. 3A illustrates an embodiment of a network securing graphical user interface (GUI).

FIG. 3B illustrates an embodiment of an encryption selection menu of the network securing GUI.

FIG. 3C illustrates an embodiment of a contact selection GUI.

FIG. 5 illustrates example source code executed by the server.

FIG. 6 illustrates another example of source code executed by the server.

FIG. 10 illustrates another example of source code executed by the server.

FIG. 11 illustrates yet another example source code executed by the server.

FIG. 14 illustrates additional source code executed by the server.

DETAILED DESCRIPTION OF THE INVENTION

Figure 1:
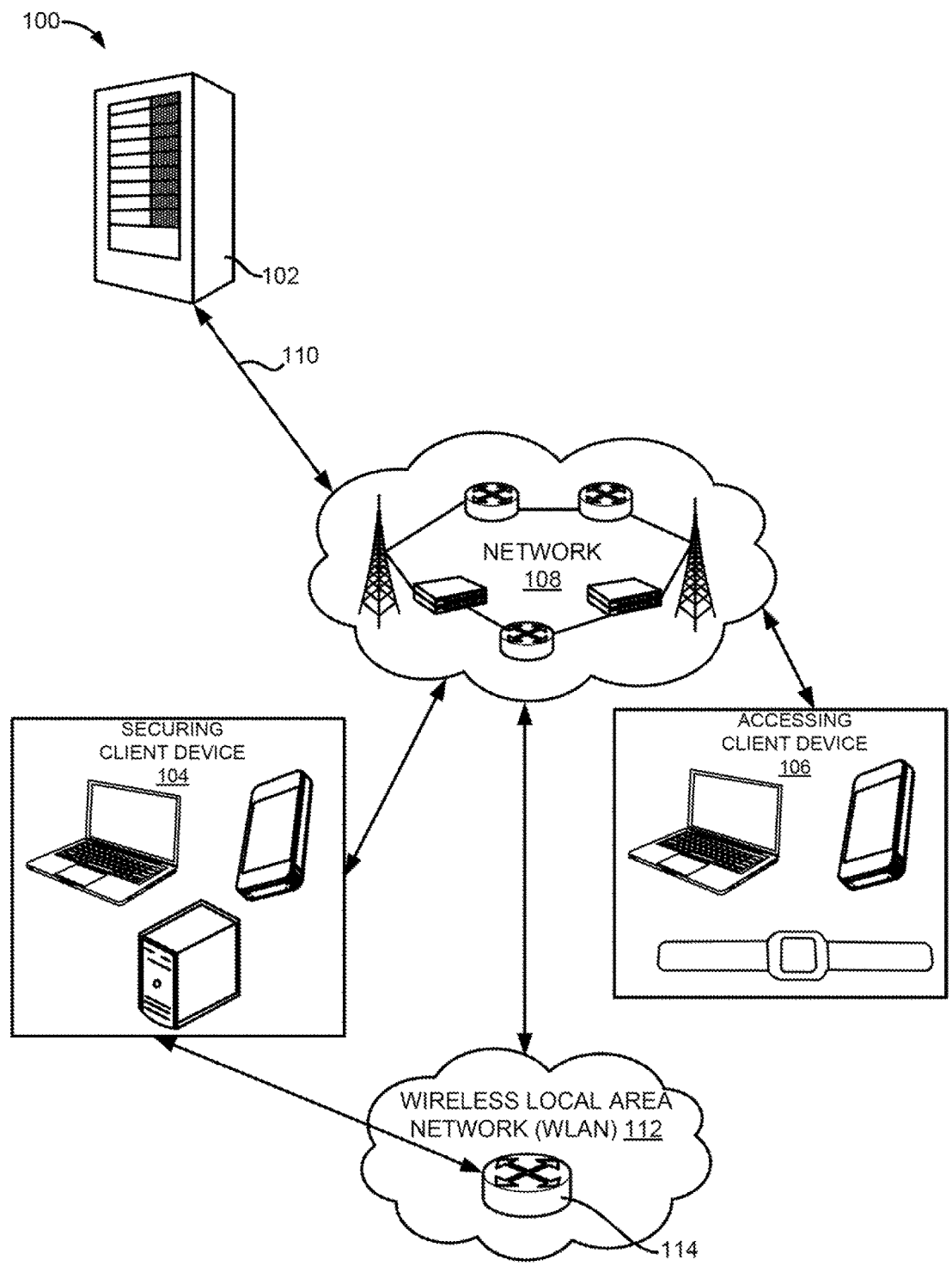
FIG. 1 illustrates an embodiment of a WiFi access management system.

FIG. 1 illustrates a WiFi access management system 100. The system 100 includes a server 102 communicatively coupled to a securing client device 104 and an accessing client device 106 through a network 108. The network 108 can be any multi-hop network that covers regions, countries, continents, or a combination thereof. Examples of the network 108 can include a cellular network such as a 3G network, a 4G network, a long-term evolution (LTE) network; a sonic communication network; a satellite network; a wide area network such as the Internet, or a combination thereof. The server 102, the securing client device 104, and the accessing client device 106 can be communicatively coupled to the network 108 through connections 110. The connections 110 can be wired connections, wireless connections, or a combination thereof.

The network 104 can include or be communicatively coupled to a wireless local area network (WLAN) 112. In one embodiment, the WLAN 112 can be a network established under the IEEE's 802.11 protocol. For example, the WLAN 112 can be a WiFi network. In other embodiments, the WLAN 112 can be a personal area network, a Bluetooth™ local area network, or a combination thereof.

As shown in FIG. 1, the securing client device 104 can be communicatively coupled or connected to the WLAN 112 through a wireless networking device. In one embodiment, the wireless networking device can be a wireless router 114 as shown in FIG. 1. In a more specific embodiment, the wireless router 114 can be a WiFi router. In other embodiments, the wireless router 114 can be a wireless gateway, a virtual router, a computing device having a network interface, or a combination thereof. For example, the securing client device 104, can connect or gain access to the WLAN 112, the network 108, or a combination thereof through the wireless router 114.

The server 102 can be a centralized server or a decentralized server. For example, the server 102 can be a cloud server, a cluster server, a part of a server farm, or a combination thereof. The server can be a rack mounted server, a blade server, a mainframe, a dedicated desktop or laptop computer, or a combination thereof. The server can be a virtualized computing resource, a grid computing resource, a peer-to-peer distributed computing resource, or a combination thereof.

The securing client device 104 or the accessing client device 106 can be a portable computing device such as a smartphone, a tablet, a laptop, a smartwatch, a personal entertainment device, or a combination thereof. In other embodiments, the securing client device 104 or the accessing client device 106 can be a desktop computer, a workstation, another server, or a combination thereof.

While FIG. 1 depicts an embodiment using one instance of each of the server 102, the securing client device 104, the accessing client device 106, the WLAN 112, and the wireless router 114, it should be understood by one of ordinary skill in the art that the system 100 can include a plurality of servers 102, securing client devices 104, accessing client devices 106, WLANs 112, and wireless routers 114. In addition, for purposes of the present disclosure, the securing client device 104 can be considered a first device and the accessing client device 106 can be considered a second device.

Figure 2B:
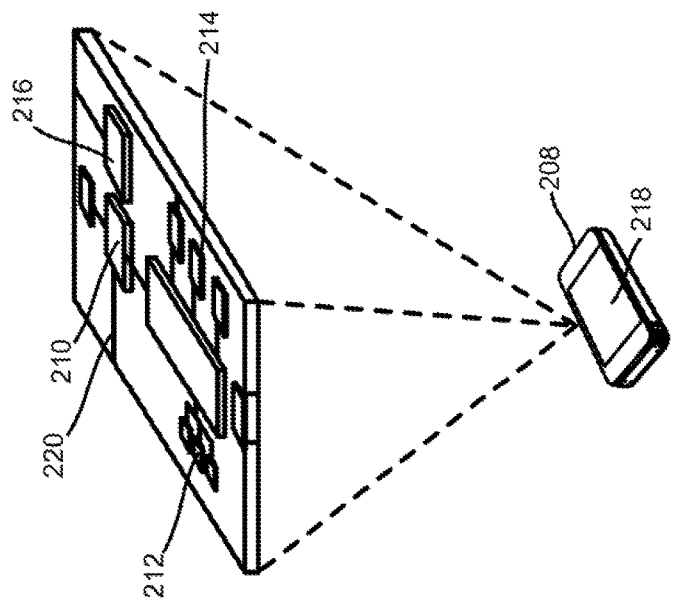
FIG. 2B illustrates an embodiment of a client device of the WiFi access management system.
Figure 2A:
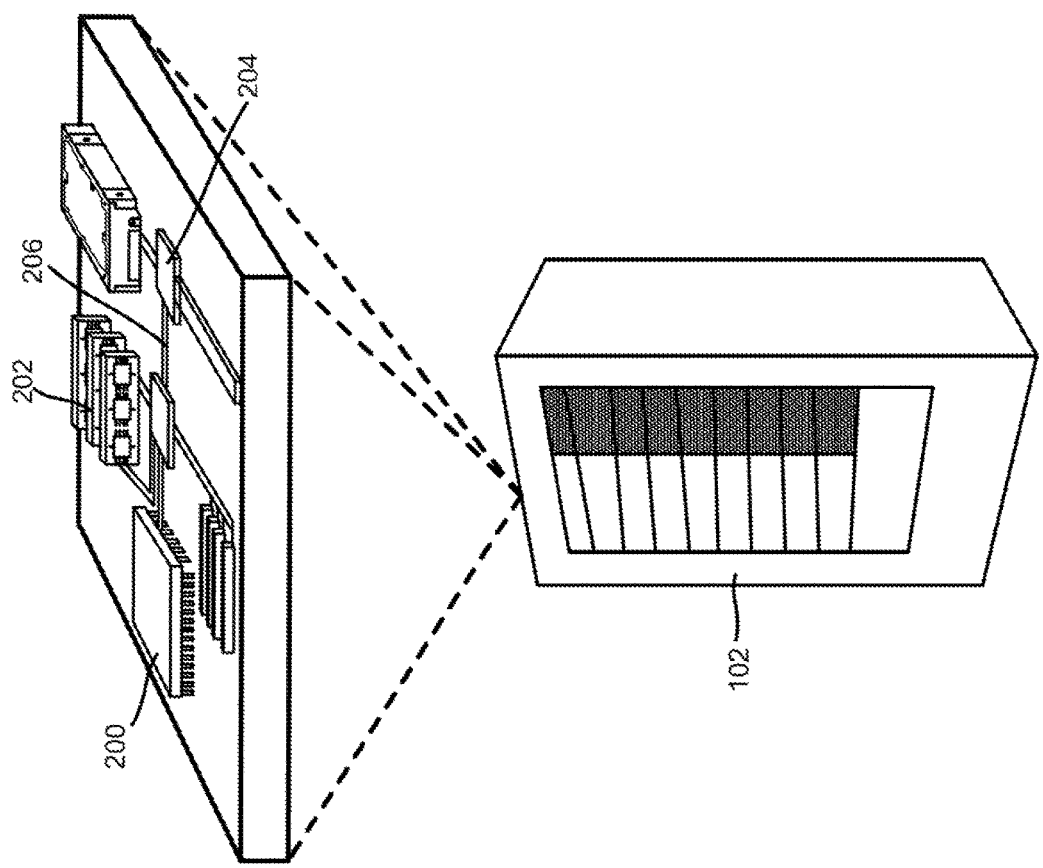
FIG. 2A illustrates an embodiment of a server of the WiFi access management system.

FIG. 2A illustrates an embodiment of the server 102 of the system 100. The server 102 can have a processing unit 200, a memory unit 202, and a server communication unit 204. The processing unit 200 can be coupled to the memory unit 202 and the server communication unit 204 through high-speed buses 206.

The processing unit 200 can include one or more central processing units (CPUs), graphical processing units (GPUs), Application-Specific Integrated Circuits (ASICs), field-programmable gate arrays (FPGAs), or a combination thereof. The processing unit 200 can execute software stored in the memory unit 202 to execute the methods described herein. The processing unit 200 can be implemented in a number of different manners. For example, the processing unit 200 can be an embedded processor, a processor core, a microprocessor, a logic circuit, a hardware finite state machine (FSM), a digital signal processor (DSP), or a combination thereof. As a more specific example the processing unit 200 can be a 64-bit processor.

The memory unit 202 can store software, data, logs, or a combination thereof. The memory unit 202 can be an internal memory. Alternatively, the memory unit 202 can be an external memory, such as a memory residing on a storage node, a cloud server, or a storage server. The memory unit 202 can be a volatile memory or a non-volatile memory. For example, the memory unit 202 can be a nonvolatile storage such as non-volatile random access memory (NVRAM), Flash memory, disk storage, or a volatile storage such as static random access memory (SRAM). The memory unit 202 can be the main storage unit for the server 102.

The server communication unit 204 can include one or more wired or wireless communication interfaces. For example, the server communication unit 204 can be a network interface card of the server 102. The server communication unit 204 can be a wireless modem or a wired modem. In one embodiment, the server communication unit 204 can be a WiFi modem. In other embodiments, the server communication unit 204 can be a 3G modem, a 4G modem, an LTE modem, a Bluetooth™ component, a radio receiver, an antenna, or a combination thereof. The server 102 can connect to or communicatively couple with the WLAN 112, the network 108, or a combination thereof using the server communication unit 204. The server 102 can transmit or receive packets or messages using the server communication unit 204.

FIG. 2B illustrates an embodiment of a client device 208 of the system 100. The client device 208 can have a client processor 210, a client memory 212, a client communication unit 214, a locational unit having a global positioning system (GPS) receiver 216, and a display 218. The client processor 210 can be coupled to the client memory 212, the client communication unit 214, and the locational unit through high-speed buses 220.

The client processor 210 can include one or more CPUs, GPUs, ASICs, FPGAs, or a combination thereof. The client processor 210 can execute software stored in the client memory 212 to execute the methods described herein. The client processor 210 can be implemented in a number of different manners. For example, the client processor 210 can be an embedded processor, a processor core, a microprocessor, a logic circuit, a hardware FSM, a DSP, or a combination thereof. As a more specific example the client processor 210 can be a 32-bit processor such as an ARM™ processor.

The client memory 212 can store software, data, logs, or a combination thereof. In one embodiment, the client memory 212 can be an internal memory. In another embodiment, the client memory 212 can be an external storage unit. The client memory 212 can be a volatile memory or a non-volatile memory. For example, the client memory 212 can be a nonvolatile storage such as NVRAM, Flash memory, disk storage, or a volatile storage such as SRAM. The client memory 212 can be the main storage unit for the client device 208.

The client communication unit 214 can be a wired or wireless communication interface. For example, the client communication unit 214 can be a network interface card of the client device 208. The client communication unit 214 can be a wireless modem or a wired modem. In one embodiment, the client communication unit 214 can be a WiFi modem. In other embodiments, the client communication unit 214 can be a 3G modem, a 4G modem, an LTE modem, a Bluetooth™ component, a radio receiver, an antenna, or a combination thereof. The client device 208 can connect to or communicatively couple with the WLAN 112, the network 108, or a combination thereof using the client communication unit 214. The client device 208 can transmit or receive packets or messages using the client communication unit 214.

The locational unit can have a GPS component such as the GPS receiver 216, an inertial unit, a magnetometer, a compass, or any combination thereof. The GPS receiver 216 can receive GPS signals from a GPS satellite. The inertial unit can be implemented as a multi-axis accelerometer including a three-axis accelerometer, a multi-axis gyroscope including a three-axis MEMS gyroscope, or a combination thereof.

The display 218 can be a touchscreen display such as a liquid crystal display (LCD), a thin film transistor (TFT) display, an organic light-emitting diode (OLED) display, or an active-matrix organic light-emitting diode (AMOLED) display. In certain embodiments, the display 218 can be a retina display, a haptic touchscreen, or a combination thereof. For example, when the client device 208 is a smartphone, the display 218 can be the touchscreen display of the smartphone.

The client device 208 can be the securing client device 104, the accessing client device 106, or a combination thereof. For purposes of the present disclosure, the client processor 210 can refer to a processor of the securing client device 104, the accessing client device 106, or a combination thereof. Moreover, the client memory 212 can refer to a memory of the securing client device 104, the accessing client device 106, or a combination thereof. In addition, the client communication unit 214 can refer to a communication unit of the securing client device 104, the accessing client device 106, or a combination thereof. Furthermore, the GPS receiver 216 can refer to a GPS receiver of the securing client device 104, the accessing client device 106, or a combination thereof. Additionally, the display 218 can refer to the display of the securing client device 104, the accessing client device 106, or a combination thereof.

When the securing client device 104 is considered the first device for purposes of the present disclosure, the client processor 210, the client memory 212, and the client communication unit 214 can be considered a first processor, a first memory, and a first communication unit, respectively. In addition, when the accessing client device 106 is considered the second device for purposes of the present disclosure, the client processor 210, the client memory 212, and the client communication unit 214 can be considered a second processor, a second memory, and a second communication unit, respectively.

FIG. 3A illustrates a network securing graphical user interface (GUI) 300 displayed on the display 218 of the securing client device 104, according to one or more embodiments. The network securing GUI 300 can be rendered through an application 302. In one embodiment, the application 302 can be written using the Xcode™ programming language, the Swift™ programming language, or a combination thereof. In other embodiments, the application 302 can be written using the Java™ programming language, the Objective-C programming language, or a C programming language.

The securing client device 104 can receive a network ID 304, a wireless key 306, an encryption type 308, GPS coordinates 404 (see FIG. 4), or a combination thereof through a user input 314 applied to the display 218 of the securing client device 104. For example, the securing client device 104 can receive the network ID 304, the wireless key 306, the encryption type 308, or a combination thereof when a user enters such information through the network securing GUI 300.

The network ID 304 can be a network name such as a network broadcast name, a service set identifier (SSID), a gateway name, or a combination thereof. In one embodiment, the network ID 304 can be the network name associated with the WLAN 112. In this and other embodiments, the network ID 304 can be the SSID associated with the wireless router 114.

The wireless key 306 can be a password used to access the WLAN 112. When a wireless access point is a router, such as the wireless router 114, the wireless key 306 can be a network key. The wireless key 306 can be associated with the network ID 304 in a memory of the wireless router 114. In one embodiment, the wireless key 306 is a string of alphanumeric characters or symbols. In a more specific embodiment, the wireless key 306 can range from 8 to 63 characters.

The encryption type 308 can be a security protocol used to secure the WLAN 112. The encryption type 308 can include WiFi Protected Access (WPA) encryption, a WiFi Protect Access II (WPA2) encryption, or a Wired Equivalent Privacy (WEP) encryption. In other embodiments, the encryption type 308 can be a security protocol using a 40-bit to 128-bit encryption key.

FIG. 3B illustrates an encryption selection menu 310. In the embodiment shown in FIG. 3B, the encryption selection menu 310 can be part of the network securing GUI 300. For example, the encryption selection menu 310 can be a scrolling menu. The encryption selection menu 310 can include an unknown encryption selection 312. The unknown encryption selection 312 is shown in FIG. 3B as a selection of the word "Any." The unknown encryption selection 312 can be selected by a user of the securing client device 104, such as first user 322 (see FIG. 3C). The unknown encryption selection 312 can be selected by the first user 322 when the encryption type 308 of the wireless key 306 is unknown to the first user 322 or an administrator of the WLAN 112. When unknown encryption selection 312 is selected, the system 100 can create a customized configuration file 900 (see FIG. 9) instructing the accessing client device 106 to try all encryption types when inputting the wireless key 306 supplied by a user of the securing client device 104. One advantage of the unknown encryption selection 312 is the ease with which the first user 322 can secure a wireless network, such as the WLAN 112, without having to remember or look up the security protocol used to secure the wireless network.

The securing client device 104 can receive the network ID 304, the wireless key 306, the encryption type 308, or a combination thereof through a user input 314 applied to the display 218 of the securing client device 104. The user input 314 can include a text or character string, a touch input, a swipe input, a click input, a cursor input, or a combination thereof. The securing client device 104 can use the network ID 304, the wireless key 306, and the encryption type 308 received through the network securing GUI 300 to create a wireless access profile 400 (see FIG. 4). The securing client device 104 can create the wireless access profile 400 and store the wireless access profile 400 in the client memory 212 of the securing client device 104 and transmit the wireless access profile 400 to the server 102. The securing client device 104 can be considered to have secured the WLAN 112 by transmitting the wireless access profile 400 to the server 102.

As previously discussed, the securing client device 104 can comprise the GPS receiver 216 of FIG. 2. The client processor 210 of the securing client device 104 can be programmed to determine current GPS coordinates 404 (see FIG. 4) of the securing client device 104 using the GPS receiver 216. The client processor 210 of the securing client device 104 can be programmed to determine the current GPS coordinates 404 of the securing client device 104 concurrent with or while creating the wireless access profile 400.

In one embodiment, the securing client device 104 can create the wireless access profile 400 while connected to the WLAN 112. In this embodiment, the securing client device can check that the securing client device 104 is connected to the WLAN 112 before successfully creating the wireless access profile 400. In another embodiment, the securing client device 104 can create the wireless access profile 400 while connected to the network 108 through a cellular connection, a wired local area network, or a wireless local area network other than the WLAN 112 being secured. In this embodiment, the securing client device 104 can create the wireless access profile 400 without checking that the securing client device 104 is actually connected to the WLAN 112 being secured.

FIG. 3C illustrates a contact selection GUI 316 displayed on the display 218 of the securing client device 104, according to one or more embodiments. The contact selection GUI 316 can be rendered through the application 302. The contact selection GUI 316 can display contact information 318 of contacts 320 stored in the client memory 212 of the securing client device 104. The contact information 318 can include names, telephone numbers, or emails of contacts 320 of the first user 322. The contact selection GUI 316 can display the contact information 318 of a second user 324. The second user 324 can be one of the contacts 320 of the first user 322. For example, the second user 324 can be a friend, acquaintance, patron, or guest of the first user 322. As a more specific example, the second user 324 can be a house-sharing guest of the first user 322.

The first user 322 can use the contact selection GUI 316 to select contacts 320 who can access the WLAN 112 secured by the securing client device 104. When a contact 320 is selected by the first user 322 through the contact selection GUI 316, the contact information 318 of the contact 320, such as the name and telephone number or email of the contact 320, can be included as part of a wireless access list 402 (see FIG. 4). The securing client device 104 can create the wireless access list 402 based on the selections of the first user 322 and the contact information 318 stored in the client memory 212 of the securing client device 104. In one embodiment, the wireless access list 402 can be a file containing the names and telephone numbers of all contacts 320 of the first user 322 who can have access to the WLAN 112 or connect to the wireless router 114 included in the wireless access profile 400. The securing client device 104 can create the wireless access list 402 and securely transmit it to the server.

In other embodiments, the securing client device 104 can create the wireless access list 402 based on contact information 318 stored in the client memory 212 as part of a social networking application or service, a photo-sharing application or service, a career-networking application or service, or a combination thereof. In these and other embodiments, the securing client device 104 can create the wireless access list 402 without individual selections made by the first user 322.

In one example embodiment, the second user 324 can be a house-sharing guest of the first user 322. The first user 322 can decide to share the WLAN 112 with the second user by selecting the second user 324 through the contact selection GUI 316. The securing client device 104 can then include the contact information 318 of the second user 324 in the wireless access list 402. The securing client device 104 can also associate the contact information 318 of the second user 324 with the WLAN 112 when creating the wireless access list 402.

The first user 322 can select multiple contacts 320 through the contact selection GUI 316. By selecting multiple contacts 320 through the contact selection GUI 316, the securing client device 104 can associate the contact information 318 of such contacts 320 with the WLAN 112 and include their contact information 318 in the wireless access list 402.

The first user 322 can also use the contact selection GUI 316 to set a connection expiration period 326. The connection expiration period 326 can be the period of time the first user 322 desires the contact 320 to have access to the WLAN 112 or be connected to the wireless router 114. The connection expiration period 326 can range from several minutes to unlimited. As examples, the connection expiration period 326 can be one hour, 12 hours, 24 hours, one week, or one month. The first user 322 can set the connection expiration period 326 for a contact 320 once the contact 320 has been selected. The first user 322 can set the connection expiration period 326 using a scroll menu displayed through the contact selection GUI 316. The securing client device 104 can include the connection expiration period 326 of the contact 320 as part of the wireless access list 402.

Figure 4:
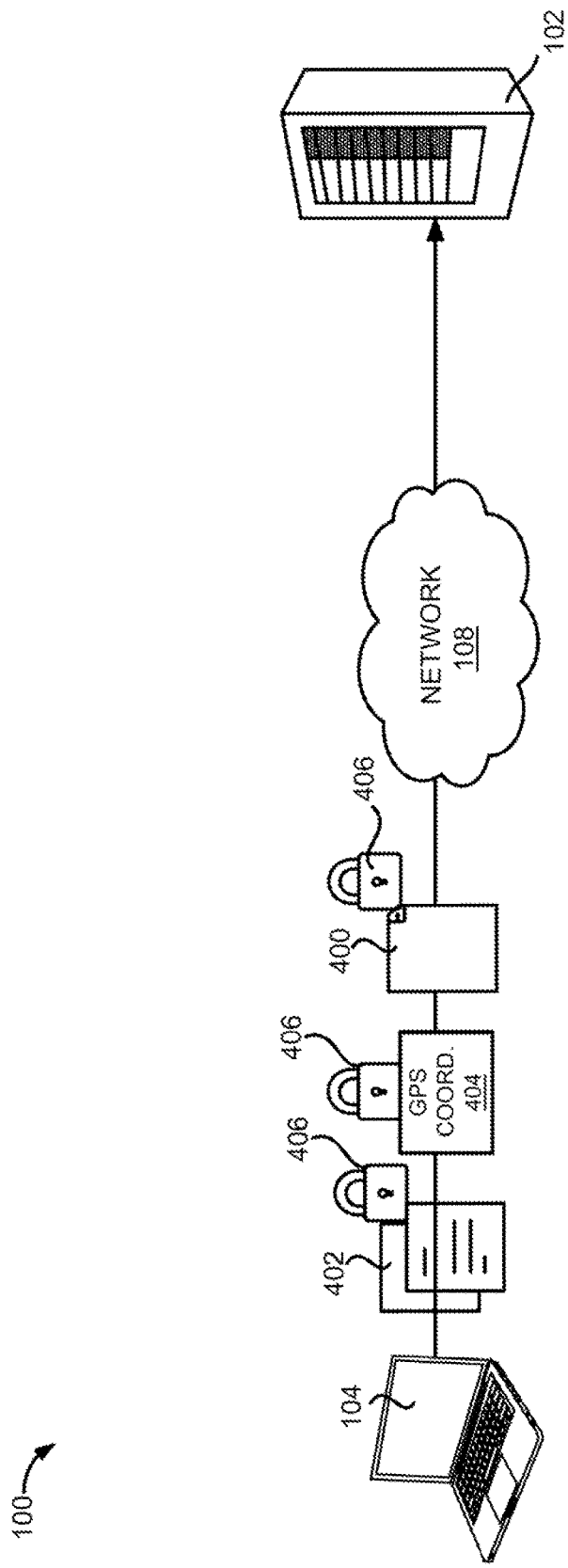
FIG. 4 illustrates an embodiment of a transmission from the securing client device to the server.

FIG. 4 illustrates an embodiment of a transmission from the securing client device 104 to the server 102. The securing client device 104 can encrypt the wireless access profile 400, the wireless access list 402, the GPS coordinates 404 of the securing client device 104, or a combination thereof using a first encryption protocol 406. The first encryption protocol 406 can be a secure hash algorithm (SHA). In certain embodiments, the first encryption protocol 406 can be a SHA-256 hash function. In other embodiments, the first encryption protocol 406 can be a SHA-512 hash function, a SHA-384 hash function, or any type of SHA-2 certificate or function.

The securing client device 104 can securely transmit the encrypted wireless access profile 400, the encrypted wireless access list 402, or the encrypted GPS coordinates 404 to the server 102 through the client communication unit 214 of the securing client device 104. In one embodiment, the securing client device 104 can transmit the encrypted wireless access profile 400, the encrypted wireless access list 402, or the encrypted GPS coordinates 404 to the server 102 while connected to the network 108 through the WLAN 112. In another embodiment, the securing client device 104 can transmit the encrypted wireless access profile 400, the encrypted wireless access list 402, or the encrypted GPS coordinates 404 to the server 102 while connected to the network 108 through a cellular connection or a wireless local area network other than the WLAN 112 being secured.

The securing client device 104 can transmit each of the encrypted wireless access profile 400, the encrypted wireless access list 402, or the encrypted GPS coordinates 404 separately. In other embodiments, the securing client device 104 can transmit the encrypted wireless access profile 400, the encrypted wireless access list 402, or the encrypted GPS coordinates 404 simultaneously or in combination.

The server 102 can receive the encrypted wireless access profile 400, the encrypted wireless access list 402, the encrypted GPS coordinates 404, or a combination thereof through the server communication unit 204. The server communication unit 204 can decrypt the encrypted wireless access profile 400, the encrypted wireless access list 402, and the encrypted GPS coordinates 404 and store the information from such files in a database such as a document-oriented database. In one embodiment, the document-oriented database can be a NoSQL database such as a MongoDB™ database.

FIG. 5 illustrates example source code executed by the server 102 to add the WLAN 112 to the document-oriented database. As can be seen in FIG. 5, the software can include commands or instructions to add the network ID 304, the wireless key 306, the encryption type 308, the GPS coordinates 404 of the WLAN 112, or a combination thereof to the document-oriented database. Also shown are one or more functions that provide the logic for an exposed API endpoint allowing the securing client device 104 to create a network such as the WLAN 112. Some of the parameters accepted at this endpoint include encryption type 308; a password or the wireless key 306; a SSID, network name, or network ID 304; and the GPS coordinates 404.

FIG. 6 illustrates a schema of how data, such as data concerning the encryption type 308 of the WLAN 112 can be organized in the document-oriented database. For example, the schema shows the definition of the "Network" model in the code, which outlines the fields on a network based on how the network is stored in a database in the backend.

Figure 7:
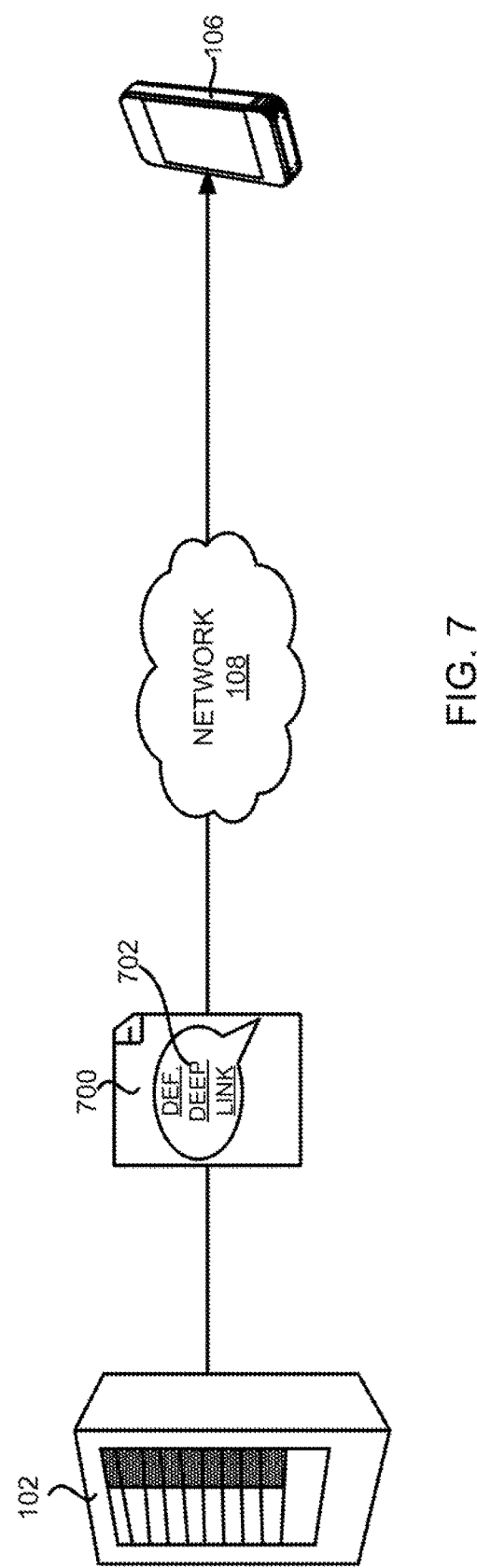
FIG. 7 illustrates an embodiment of a transmission from the server to the accessing client device.

FIG. 7 illustrates an embodiment of a transmission from the server 102 to the accessing client device 106. After receiving and decrypting the wireless access profile 400, the encrypted wireless access list 402, and the encrypted GPS coordinates 404 from the securing client device 104, the server 102 can send an invitation message 700 to a contact 320 included in the wireless access list 402. For example, the contact 320 can be the second user 324. The server 102 can send the invitation message 700 through the server communication unit 204.

In some embodiments, the invitation message 700 can be a text message such as a Short Message Service (SMS) message or a Multimedia Messaging Service (MMS) message. In these embodiments, the server 102 can send a text message representing the invitation message 700 to a telephone number associated with one of the contacts 320 included in the wireless access list 402. The server 102 can send the invitation message 700 to a device associated with the telephone number. For purposes of this disclosure, the device receiving the invitation message 700 can be considered the accessing client device 106.

In other embodiments, the invitation message 700 can be an email message. In these embodiments, the server 102 can send an email representing the invitation message 700 to the email address associated with one of the contacts 320 included in the wireless access list 402.

The invitation message 700 can include a deferred deep link 702. The deferred deep link 702 can be a deep linking uniform resource locator (URL) address directing a device to open a specific page of an application or website. The deferred deep link 702 can be created using a deep linking service provided by Branch.IO™, Mobileapptracking-.com™, or Tapstream™. In certain embodiments, the deferred deep link 702 can direct the accessing client device 106 to a specific page of an application.

In one example embodiment, the second user 324 can cause the accessing client device 106 to undertake a number of redirect operations by clicking on the deferred deep link 702. The accessing client device 106 can first be instructed to determine whether the application 302 is currently installed on the accessing client device 106. If the application 302 is not installed on the accessing client device 106, the deferred deep link 702 can direct the accessing client device 106 to an application store or app store to download the application 302. In another embodiment, a link included in the invitation message 700 can direct the accessing client device 106 to directly download an installable wireless configuration profile or a customized configuration file 900 if supported by an operating system 806 (see FIG. 8B) of the accessing client device 106.

Once the application 302 is downloaded or if the application 302 is already installed on the accessing client device 106, the deferred deep link 702 can direct the accessing client device 106 to automatically open an invitation GUI 800 (see FIG. 8A) through the application 302. The accessing client device 106 can automatically open the invitation GUI without receiving any user input 314 from a user of the accessing client device 106, such as the second user 324.

Figure 8A:
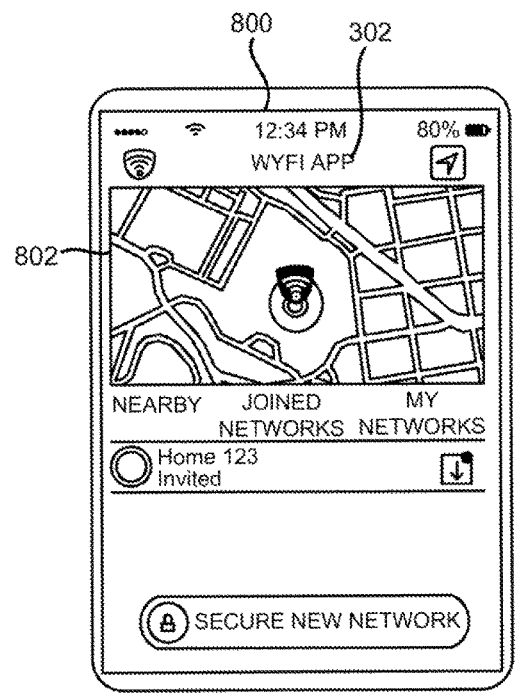
FIG. 8A illustrates an embodiment of an invitation GUI.

FIG. 8A illustrates an embodiment of the invitation GUI 800 displayed on the display 218 of the accessing client device 106. The invitation GUI 800 can display a map graphic 802 within the invitation GUI 800. The map graphic 802 can show the location of the WLAN 112 as determined using the GPS coordinates 404 received from the securing client device 104. A user of the accessing client device 106, such as the second user 324, can request a connection to the WLAN 112 through the invitation GUI 800.

In an alternative embodiment, the accessing client device 106 can transmit a request 804 (see FIG. 8B) to the server 102 to connect to the WLAN 112 when an invitation message 700 has not been sent to the accessing client device 106. In this embodiment, the server 102 can then transmit the request 804 to connect to the WLAN 112 directly to the securing client device 104 for approval from a user of the securing client device 104.

Figure 8B:
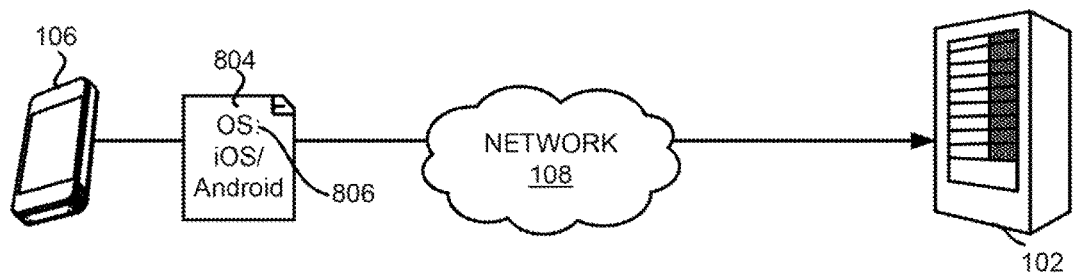
FIG. 8B illustrates an embodiment of a transmission from the accessing client device to the server.

FIG. 8B illustrates an embodiment of a transmission from the accessing client device 106 to the server 102. The accessing client device 106 can transmit a request 804 to connect to the WLAN 112 to the server 102 when the accessing client device 106 receives the user input 314 through the invitation GUI 800. In one embodiment, the request 804 can also include information pertaining to the operating system 806 of the accessing client device 106. The request 804 can be one or more communication packets, such as transmission control protocol (TCP) packets, containing a header and a payload.

In another embodiment, the server 102 can determine the operating system 806 of the accessing client device 106 when the accessing client device 106 downloads the application 302 from an application store. For example, the server 102 can determine the operating system 806 of the accessing client device 106 based on a download log. The operating system 806 of the accessing client device 106 can be determined by a browser identification function or a device fingerprinting function called by the accessing client device 106. In an alternative embodiment, information concerning the operating system 806 of the accessing client device 106 can be provided by the deferred deep link 702.

The server 102 can receive the request 804 to connect to the WLAN 112 from the accessing client device 106. The server 102 can determine the operating system 806 of the accessing client device 106 based on the request 804 or when the accessing client device 106 downloads the application 302 through an application store associated with an OS provider such as the Apple™ app Store or the Android™ app store.

Figure 9:
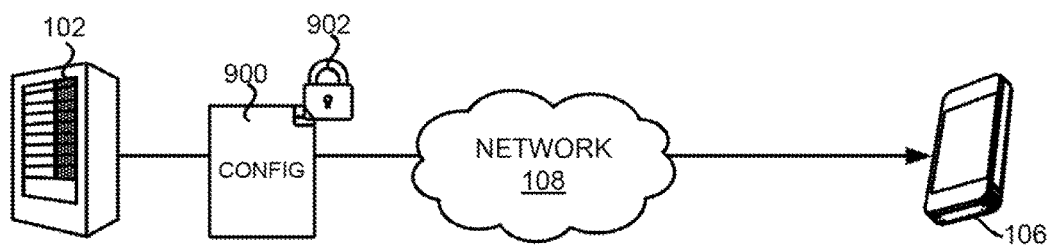
FIG. 9 illustrates an embodiment of another transmission from the server to the accessing client device.

FIG. 9 illustrates an embodiment of the server 102 creating a customized configuration file 900 and the server 102 transmitting the customized configuration file 900 to the accessing client device 106. The server 102 can create the customized configuration file 900 by executing instructions stored in the memory unit 202 of the server 102 using the processing unit 200. The server 102 can create the customized configuration file 900 based on information concerning the operating system 806 of the accessing client device 106 and information from the wireless access profile 400 and the wireless access list 402. In one embodiment, the server 102 can create the customized configuration file 900 using the network ID 304 of the WLAN 112, the wireless key 306 received from the securing client device 104, and the encryption type 308 selected by the first user 322. In addition, the server 102 can create the customized configuration file 900 using the connection expiration period 326 set by the first user 322.

The server 102 can create the customized configuration file 900 using the connection expiration period 326 in order to limit the amount of time the accessing client device 106 can connect to the WLAN 112. In one embodiment, the customized configuration file 900 can be an XML file. In this and other embodiments, the customized configuration file 900 can be an XML file storing key-value pairs in a property list (.plist) format and have a .mobileconfig suffix in the filename of the customized configuration file 900 when the operating system 806 of the accessing client device 106 is a Mac OS X™ or iOS™ operating system. In another embodiment, a customized configuration can be transmitted directly into the application 302 when the operating system 806 of the accessing client device 106 is an Android™ operating system.

In a further embodiment, the customized configuration file 900 can be an XML file with a wireless profile configuration generated by netsh or gpedit.msc, when the operating system of the accessing client device is a Microsoft™ Windows™ operating system. This customized configuration file 900 can be generated in the same manner as the above mentioned mobileconfig files except in a format specific to the Microsoft™ Window™ operating system.

The server 102 can create the customized configuration file 900 on the fly using information concerning the operating system 806 of the accessing client device 106 and information included in the wireless access profile 400. The server 102 can then transmit the customized configuration file 900 using a second encryption protocol 902. The second encryption protocol 902 can be a secure hash algorithm. In one embodiment, the second encryption protocol 902 can be a SHA-256 hash function. The server 102 can transmit the customized configuration file 900 to the accessing client device 106 through the network 108. The server 102 can transmit the customized configuration file 900 through the server communication unit 204.

FIG. 10 illustrates example source code executed by the server to create the customized configuration file 900. Depicted in FIG. 10 is a helper function that can take the configuration of a network object (parallel to a network document in Mongo™) and write the configuration of the network object to a mobileconfig file.

FIG. 11 illustrates example source code executed by the server 102 to encrypt configuration information concerning the WLAN 112. In the embodiment shown in FIG. 11, the server 102 can encrypt the configuration information using an AES-128 cipher. The server 102 can encrypt configuration information concerning the WLAN 112. For example, the server 102 can use OpenSSL to generate an SMIME signature for the AES-128 encrypted network configuration information in a base-64 form.

Figure 12A:
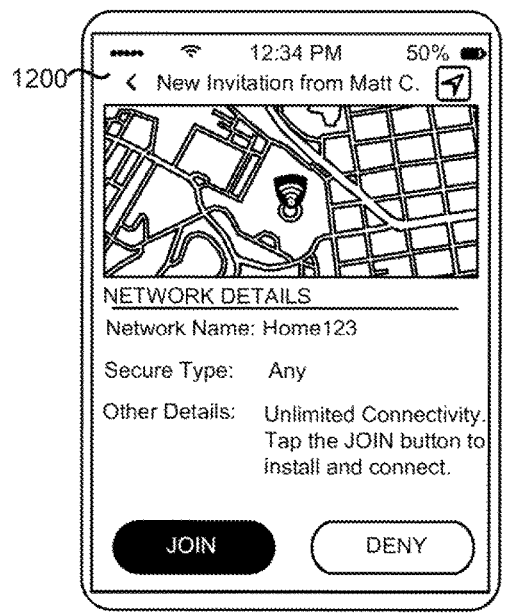
FIG. 12A illustrates an embodiment of a connection GUI.

FIG. 12A illustrates an embodiment of a connection GUI 1200. The accessing client device 106 can display the connection GUI 1200 on the display of the device when the accessing client device 106 receives the customized configuration file 900 from the server 102. A user of the accessing client device 106, such as the second user 324, can apply a user input 314 to the connection GUI 1200 to indicate the user's desire to connect to the WLAN 112. For example, the second user 324 can indicate the user's desire to connect to the WLAN 112 by applying a touch input to a "JOIN" button displayed on the connection GUI 1200.

Figure 12B:
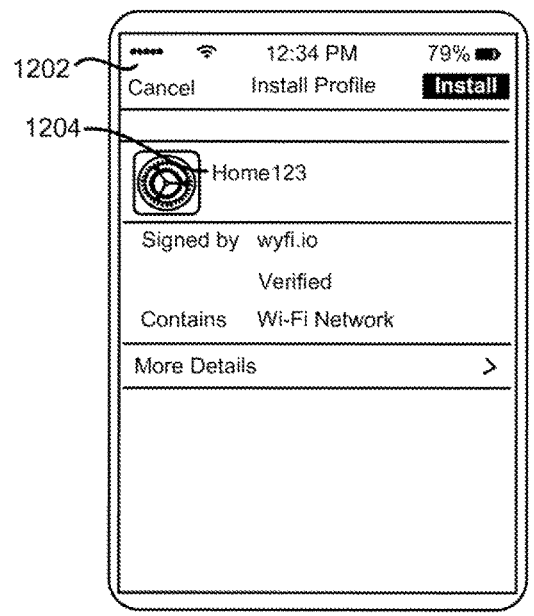
FIG. 12B illustrates an embodiment of a configuration installation GUI.

FIG. 12B illustrates an embodiment of a configuration installation GUI 1202. The accessing client device 106 can display the configuration installation GUI 1202 immediately after the second user 324 applies the user input 314 to the connection GUI 1200. In one embodiment, the accessing client device 106 can momentarily open a web browser application on the accessing client device 106 after the second user 324 applies the user input 314 to the connection GUI 1200. In this embodiment, the system 100 can embed an advertisement in the web browser when the accessing client device 106 momentarily opens the web browser.

The accessing client device 106 can install the customized configuration file 900 in the client memory 212 of the accessing client device 106 when the second user 324 applies a user input 314 to the configuration installation GUI 1202. For example, the accessing client device 106 can install the customized configuration file 900 in the client memory 212 of the accessing client device 106 when the second user 324 applies a user input 314 to an "INSTALL" button on the configuration installation GUI 1202. The accessing client device 106 can store network configuration information 1204 associated with the WLAN 112 in the client memory 212 of the accessing client device 106 when the customized configuration file 900 is installed on the accessing client device 106. The network configuration information 1204 can include configuration information received from the securing client device 104 such as the SSID of the wireless router 114, the wireless key 306, and the encryption type 308.

Figure 12C:
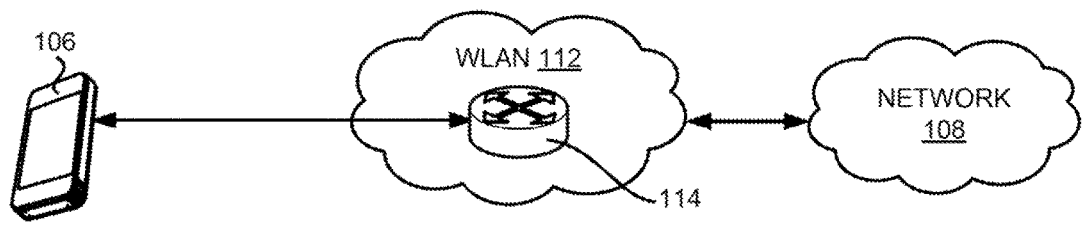
FIG. 12C illustrates an embodiment of the accessing client device connecting to the WLAN.

FIG. 12C illustrates an embodiment of the accessing client device 106 connecting to the WLAN 112 after installing the customized configuration file 900. The accessing client device 106 can automatically connect to the WLAN 112 when the accessing client device 106 is in range of the WLAN 112. The accessing client device 106 can connect to the WLAN 112 through the wireless router 114. The accessing client device 106 can connect to the WLAN without the second user 324 having to manually enter the wireless key 306 of the WLAN into the network settings of the accessing client device 106. The accessing client device 106 can connect to the WLAN 112 without displaying the wireless key 306 on the display 218 of the accessing client device 106.

The server 102 can also transmit a new instance of the customized configuration file 900 to change the network configuration information 1204 stored in the client memory 212 of the accessing client device 106. For example, the server 102 can transmit a new instance of the customized configuration file 900 to lengthen or shorten the connection expiration period 326 included in a previous instance of the customized configuration file 900. For example, when the accessing client device 106 is an iOS™ or OS X™ device the connection expiration period 326 can be controlled by adding a field to the mobileconfig file. The operating system 806, such as the iOS™ or the OS X™ operating system, can then delete the wireless configuration profile from the device when the specified time has expired. In the case where the operating system 806 of the accessing client device 106 is an Android™ or Windows™ operating system, the application 302 can directly control the connection expiration period 326 and can directly remove the wireless configuration profile when the connection expiration period 326 expires.

As a more specific example, the first user 322 can be an administrator of the WLAN 112 and can desire to shorten the amount of time the second user 324 can be connected to the WLAN 112. In this example, the first user 322 can use the securing client device 104 to create a new instance of the wireless access profile 400 having a new instance of the connection expiration period 326. The server 102 can then create a new instance of the customized configuration file 900 using the new instance of the connection expiration period 326. The server 102 can then transmit the new instance of the customized configuration file 900 to the accessing client device 106. In certain embodiments, the connection expiration period 326 of the accessing client device 106 can be adjusted once the accessing client device 106 receives the new instance of the customized configuration file 900. In these embodiments, the connection expiration period 326 can be adjusted without additional input from the user of the accessing client device 106.

In these and other embodiments, the server 102 can transmit a new instance of the customized configuration file 900 to the accessing client device 106 to update or change the network ID 304, the wireless key 306, or the encryption type 308 of a wireless router 114 associated with a previous instance of the customized configuration file 900. For example, the server 102 can transmit a new instance of the customized configuration file 900 to update an SSID of a wireless router accessible to the accessing client device 106.

Figure 13:
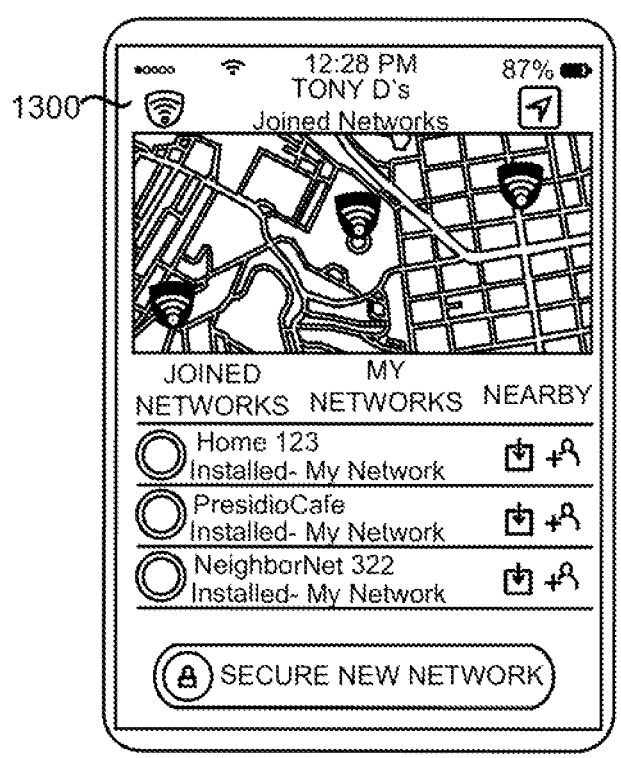
FIG. 13 illustrates an embodiment of a joined networks GUI.

FIG. 13 illustrates an embodiment of a joined networks GUI 1300. The second user 324 can use the joined networks GUI 1300 to view all WLANs accessible to the accessing client device 106 through the system 100. For example, the WLANs can be secured by users who are contacts of the second user 324.

FIG. 14 illustrates source code executed by the server 102 for determining secured WLANs near the accessing client device 106. For example, the accessing client device 106 can transmit the GPS coordinates 404 of the accessing client device 106 to the server 102. The server 102 can then use the GPS coordinates 404 of the accessing client device 106 to determine nearby WLANs which have been secured by other users of the system 100. The server 102 can then generate a map of all WLANs in the vicinity of the accessing client device 106. The server 102 can use a map reduce algorithm, a Dijkstra's algorithm, a shortest path algorithm, or a combination thereof to determine the WLANs in the vicinity of the accessing client device 106.

Figure 15:
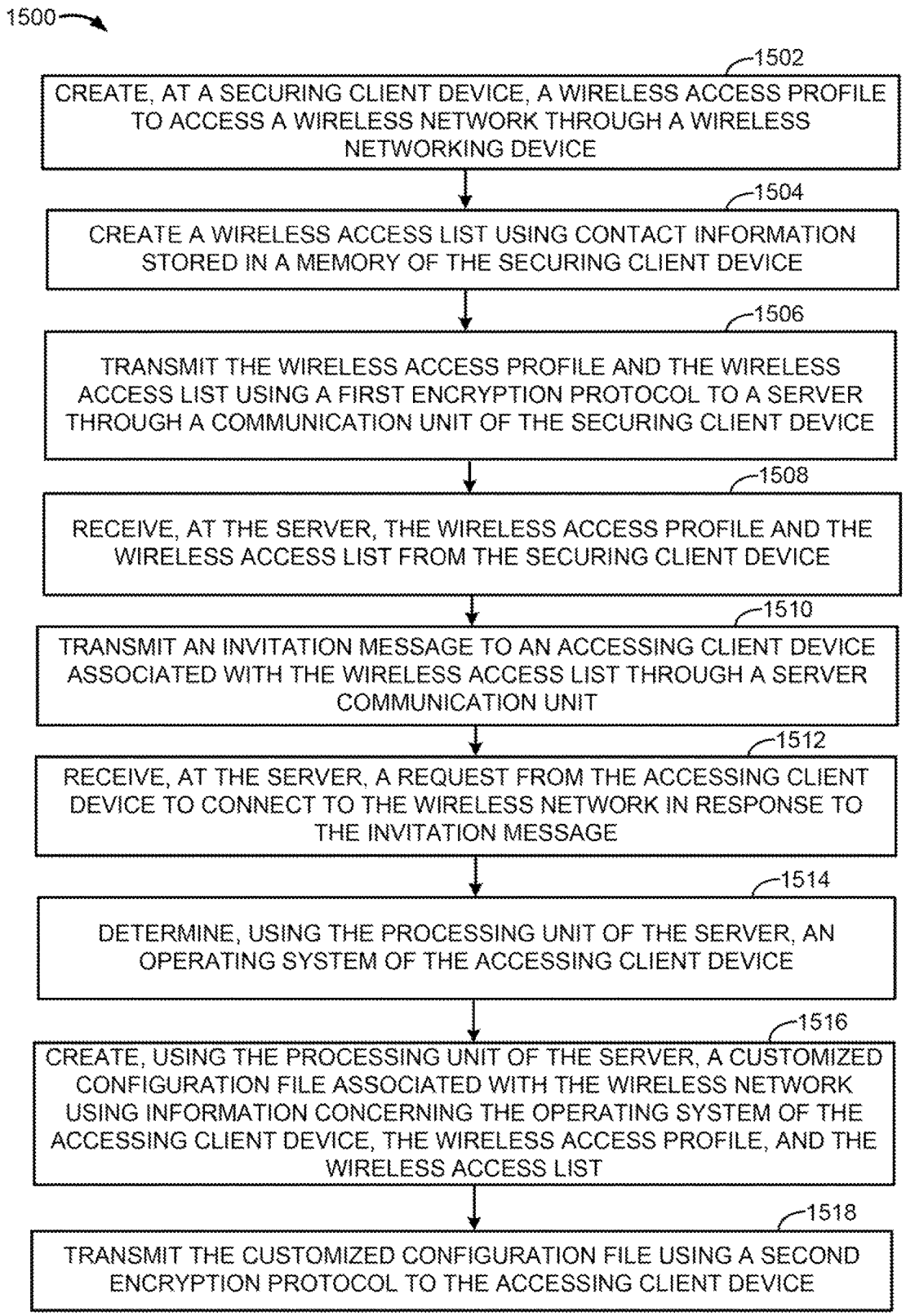
FIG. 15 illustrates a method of operation of the WiFi access management system.

FIG. 15 illustrates a method 1500 of operation of the WiFi access management system. The method 1500 can include creating, at the securing client device 104 using the client processor 210 of the securing client device 104, the wireless access profile 400 to access the WLAN 112 through the WLAN 112 in operation 1502. The method 1500 can then include creating, using the client processor 210 of the securing client device 104, the wireless access list 402 based on the contact information 318 stored in the client memory 212 of the securing client device 104 in operation 1504. The method 1500 can further include transmitting the wireless access profile 400 and the wireless access list 402 using the first encryption protocol 406 to the server 102 through the client communication unit 214 of the securing client device 104 in operation 1506.

The method 1500 can include receiving, at the server 102, the wireless access profile 400 and the wireless access list 402 from the securing client device 104 in operation 1508. The method 1500 can further include transmitting the invitation message 700 to the accessing client device 106 associated with the wireless access list 402 through the server communication unit 204 of the server 102 in operation 1510. The method 1500 can also include receiving, at the server 102, the request 804 from the accessing client device 106 to connect to the WLAN 112 in response to the invitation message 700 in operation 1512. The method 1100 can further include determining, using the processing unit 200 of the server 102, the operating system 806 of the accessing client device 106 in operation 1514.

The method 1500 can also include creating, using the processing unit 200 of the server 102, the customized configuration file 900 associated with the WLAN 112 using information concerning the operating system 806 of the accessing client device 106 and information from the wireless access profile 400, and the wireless access list 402 in operation 1516. In addition, the method 1500 can include transmitting the customized configuration file 900 using the second encryption protocol 902 to the accessing client device 106 through the server communication unit 204 in operation 1518.

Figure 16:
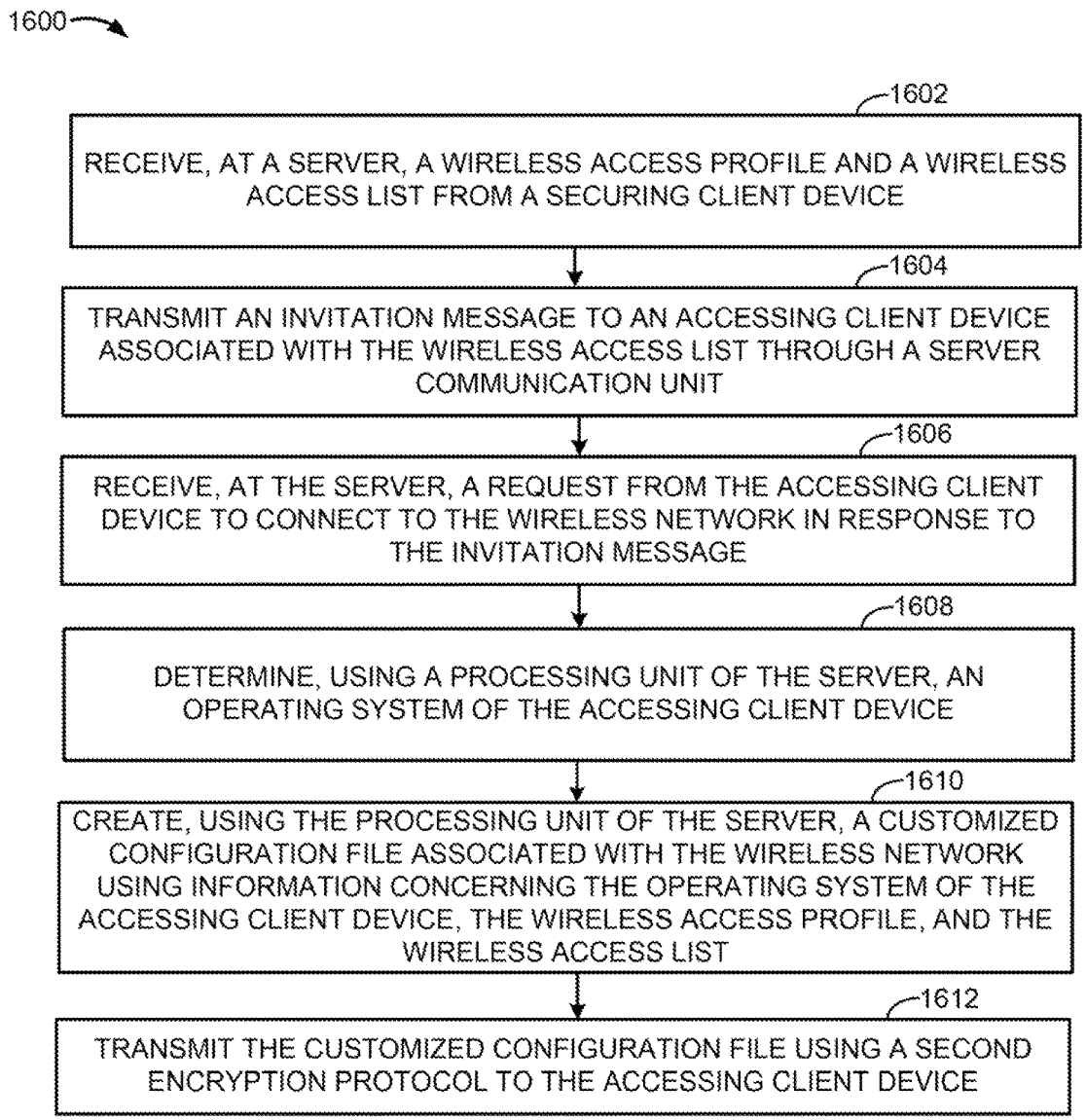
FIG. 16 illustrates another method of operation of the WiFi access management system.

FIG. 16 illustrates another method 1600 of operation of the WiFi access management system. The method 1600 can include receiving, at the server 102, the wireless access profile 400 and the wireless access list 402 from the securing client device 104 in operation 1602. The method 1600 can further include transmitting the invitation message 700 to the accessing client device 106 associated with the wireless access list 402 through the server communication unit 204 of the server 102 in operation 1604. The method 1600 can also include receiving, at the server 102, the request 804 from the accessing client device 106 to connect to the WLAN 112 in response to the invitation message 700 in operation 1606. The method 1600 can further include determining, using the processing unit 200 of the server 102, the operating system 806 of the accessing client device 106 in operation 1608.

The method 1600 can also include creating, using the processing unit 200 of the server 102, the customized configuration file 900 associated with the WLAN 112 using information concerning the operating system 806 of the accessing client device 106, the wireless access profile 400, and the wireless access list 402 in operation 1610. In addition, the method 1600 can include transmitting the customized configuration file 900 using the second encryption protocol 902 to the accessing client device 106 through the server communication unit 204 in operation 1612.

Figure 17:
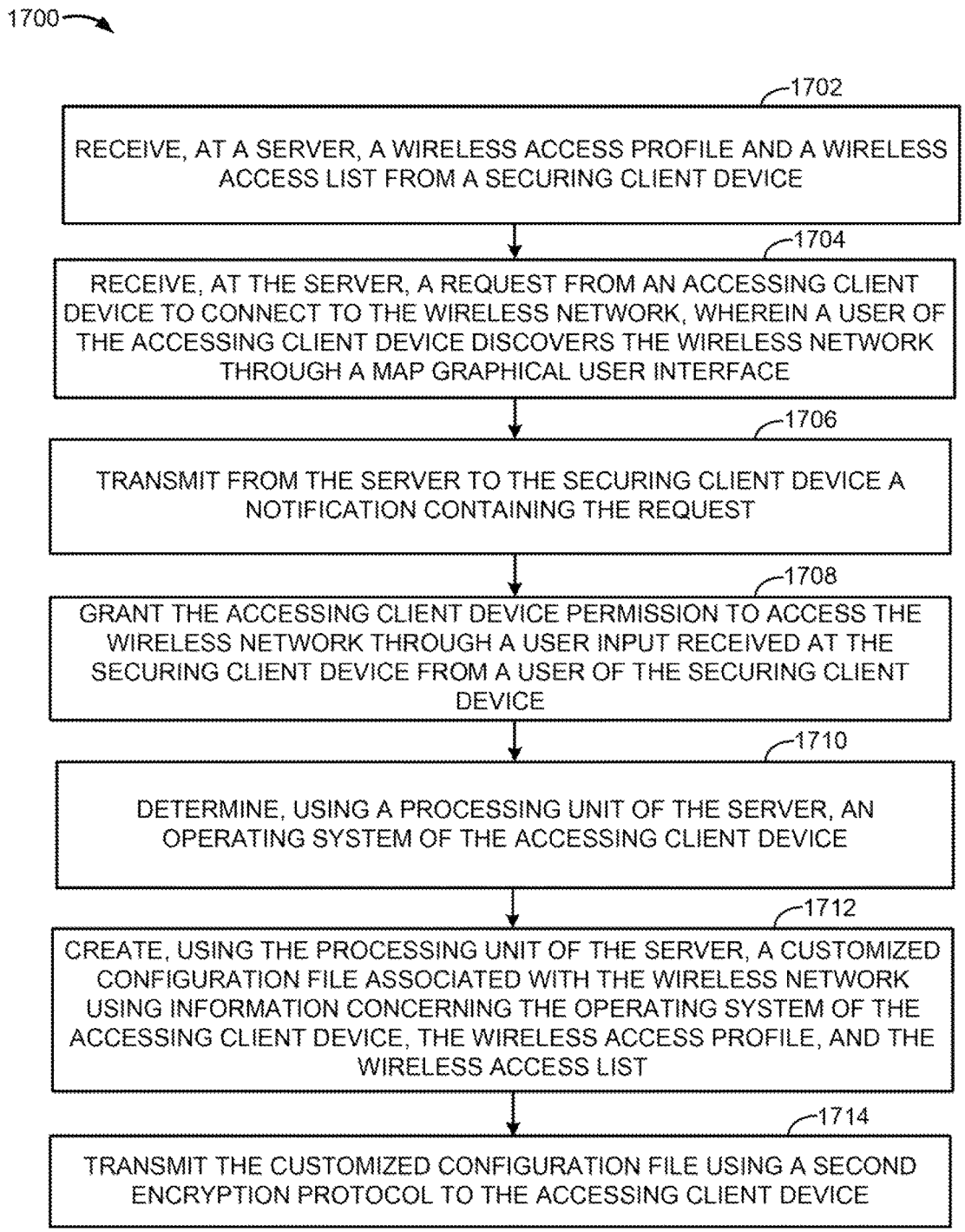
FIG. 17 illustrates another method of operation of the WiFi access management system.

FIG. 17 illustrates yet another method 1700 of operation of the WiFi access management system. In this method 1700, the user of the accessing client device 106 can be a vacation rental guest or a house-sharing guest of the user of the securing client device 104. In this example, the WLAN 112 can be a wireless network in a vacation house or a rental property of the user of the securing client device 104.

The method 1700 can include receiving, at the server 102, the wireless access profile 400 and the wireless access list 402 from the securing client device 104 in operation 1702. The method 1700 can further include receiving, at the server 102, a request from the accessing client device 106 to connect to the WLAN 112 without having received an invitation message 700 from the securing client device 104 in operation 1704. In this example operation, the user of the accessing client device 106 can discover the WLAN 112 through a map GUI displayed on the display 218 of the accessing client device 106. For example, the map GUI can be a variation of the map GUI shown in FIG. 13.

The method 1700 can further include transmitting, from the server 102 to the securing client device 104, a notification containing the request in operation 1706. In one example embodiment, the notification can be a push notification. In another embodiment, the notification can be an email notification, a text message, or a combination thereof.

As a more specific example, the method 1700 can include granting the accessing client device 106 permission to access the WLAN 112 through a user input received at the securing client device 104 from the user of the securing client device 104 in operation 1708. The input can include a touch input, a swipe input, a click input, or any other input applied to the display 218 of the securing client device 104 or an input device connected to the securing client device 104. The method 1700 can further include determining, using the processing unit 200 of the server 102, the operating system 806 of the accessing client device 106 in operation 1710.

The method 1700 can also include creating, using the processing unit 200 of the server 102, the customized configuration file 900 associated with the WLAN 112 using information concerning the operating system 806 of the accessing client device 106, the wireless access profile 400, and the wireless access list 402 in operation 1712. In addition, the method 1700 can include transmitting the customized configuration file 900 using the second encryption protocol 902 to the accessing client device 106 through the server communication unit 204 in operation 1714.

Although FIGS. 3A, 3B, 3C, 8A, 12A, 12B, and 13 of the present disclosure show a standalone mobile application, it should be understood by one of ordinary skill in the art that the methods disclosed herein can also be implemented as a software development kit (SDK) configured to be integrated into the code stack of a mobile or web platform. For example, the methods disclosed herein can be implemented as executable code configured to be integrated into the code stack of an online home sharing platform.

The system 100 and methods described in the present disclosure provides an improvement in the field of network security. The system 100 and methods described herein provides improvements in how network access is granted to guest devices. For example, a user of a client device can be granted access to a WLAN, such as a home or business WiFi network, without knowing the wireless key associated with the wireless access point.

Moreover, the system 100 and methods described herein provides improvements in the functioning of mobile client devices. The system 100 and methods described herein provides improvements in how mobile client devices connect to WLANs. For example, by installing the customized configuration file created on-the-fly by the server, a mobile client device such as a mobile phone, tablet, or smartwatch, can automatically connect to a WLAN without requiring the user of such a device to manually enter the wireless key through a network settings menu of the mobile device.

A number of embodiments have been described. Nevertheless, it will be understood by one of ordinary skill in the art that various modifications may be made without departing from the spirit and scope of the embodiments. In addition, the flowcharts or logic flows depicted in the figures do not require the particular order shown, or sequential order, to achieve desirable results. In addition, other steps or operations may be provided, or steps or operations may be eliminated, from the described flows, and other components may be added to, or removed from, the described systems. Accordingly, other embodiments are within the scope of the following claims.

It will be understood by one of ordinary skill in the art that the various methods disclosed herein may be embodied in a non-transitory readable medium, machine-readable medium, and/or a machine accessible medium comprising instructions compatible, readable, and/or executable by a processor or processing unit of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

We claim:

1. A WiFi (Wireless Fidelity) access management system, comprising:
  a first client device comprising a first processor, a first memory, a first communication unit, wherein the first processor is programmed to:
  create a wireless access profile to access a wireless network through a wireless networking device,
  create a wireless access list based on contact information stored in the first memory, transmit the wireless access profile and the wireless access list using a first encryption protocol to a server through the first communication unit; and the server comprising a processing unit, a memory unit, and a server communication unit, wherein the processing unit is programmed to:

receive the wireless access profile and the wireless access list from the first client device, transmit an invitation message to a second client device associated with the wireless access list through the server communication unit, receive a request from the second client device to connect to the wireless network in response to the invitation message, determine an operating system of the second client device, create a customized configuration file associated with the wireless network using information concerning the operating system of the second client device and using information from the wireless access profile and the wireless access list, and transmit the customized configuration file using a second encryption protocol to the second client device through the server communication unit;

wherein the invitation message comprises a deferred deep link directing the second client device to download an application and wherein a second processor of the second client device is programmed to:

display an invitation graphical user interface on a display of the second client device through the application; and transmit the request to connect to the wireless network and information concerning the operating system of the second client device to the server when the second client device receives a user input through the invitation graphical user interface.

2. The system of claim 1, wherein the first client device further comprises a GPS receiver and the first processor is programmed to:

determine current GPS coordinates of the first client device using the GPS receiver concurrent with creating the wireless access profile, and transmit the current GPS coordinates along with the wireless access profile and the wireless access list to the server through the first communication unit.

3. The system of claim 1, wherein the wireless access profile comprises a network identification, a wireless key to access the wireless network, and an encryption type.

4. The system of claim 1, wherein the customized configuration file is an XML file.

5. The system of claim 1, wherein the customized configuration file is a mobileconfig file when the operating system of the second client device is an iOS operating system.

6. The system of claim 1, wherein a second processor of the second client device is programmed to:

store in a second memory of the second client device network configuration information associated with the wireless network when the customized configuration file is installed on the second client device; and connect to the wireless network automatically through a second communication unit of the second client device after the second client device installs the customized configuration file.

7. The system of claim 6, wherein the second client device connects to the wireless network without displaying the wireless key on a display of the second client device.

8. The system of claim 1, wherein the wireless access list comprises a connection expiration period and wherein the server creates the customized configuration file using the connection expiration period in order to limit a connection of the second client device to the wireless network to the connection expiration period.

9. The system of claim 1, wherein the wireless networking device is a wireless router.

10. A method of managing access to a WiFi network, comprising:

creating, at a first client device using a first processor of the first client device, a wireless access profile to access a wireless network through a wireless networking device;

creating, at the first client device using the first processor, a wireless access list using contact information stored in a first memory of the first client device;

transmitting the wireless access profile and the wireless access list using a first encryption protocol to a server through a first communication unit of the first client device;

receiving, at the server, the wireless access profile and the wireless access list from the first client device;

transmitting an invitation message to a second client device associated with the wireless access list through a server communication unit of the server;

receiving, at the server, a request from the second client device to connect to the wireless network in response to the invitation message;

determining, using a processing unit of the server, an operating system of the second client device;

creating, using the processing unit, a customized configuration file associated with the wireless network using information concerning the operating system of the second client device and using information from the wireless access profile and the wireless access list; and transmitting the customized configuration file using a second encryption protocol to the second client device through the server communication unit;

displaying, on a display of the second client device, an invitation graphical user interface through an application, wherein the application is downloaded in response to a user input activating a deferred deep link included in the invitation message; and transmitting the request to connect to the wireless network and information concerning the operating system of the second client device to the server when the second client device receives another user input through the invitation graphical user interface.

11. The method of claim 10, further comprising:

determining, at the first client device, current GPS coordinates of the first client device using a GPS receiver of the first client device concurrent with creating the wireless access profile; and transmitting the current GPS coordinates along with the wireless access profile and the wireless access list to the server through the first communication unit.

12. The method of claim 10, further comprising:

installing, at the second client device, the customized configuration file;

storing, in a second memory of the second client device, network configuration information associated with the wireless network when the customized configuration file is installed; and connecting to the wireless network automatically through a second communication unit of the second client device after the second client device installs the customized configuration file.

13. The method of claim 10, further comprising creating, by the processing unit of the server, the customized configuration file using a connection expiration period, wherein the customized configuration file limits a connection of the second client device to the wireless network to the connection expiration period.

14. A non-transitory readable medium comprising computer executable instructions stored thereon, wherein the instructions include the steps comprising:
- receiving, at a server, a wireless access profile and a wireless access list from a first client device;
- transmitting an invitation message to a second client device associated with the wireless access list through a server communication unit of the server;
- receiving, at the server, a request from the second client device to connect to a wireless network associated with the wireless access profile in response to the invitation message;
- determining, using a processing unit of the server, an operating system of the second client device;
- creating, using, the processing unit, a customized configuration file associated with the wireless network using information concerning the operating system of the second client device and information from the wireless access profile and the wireless access list; and
- transmitting the customized configuration file using a second encryption protocol to the second client device through the server communication unit;
- displaying, on a display of the second client device, an invitation graphical user interface through an application, wherein the application is downloaded in response to a user input activating a deferred deep link included in the invitation message; and
transmitting the request to connect to the wireless network and information concerning the operating system of the second client device to the server when the second client device receives another user input through the invitation graphical user interface.

15. The non-transitory readable medium of claim 14, further comprising:
- determining, at the first client device, current GPS coordinates of the first client device using a GPS receiver of the first client device concurrent with creating the wireless access profile; and
- transmitting the current GPS coordinates along with the wireless access profile and the wireless access list to the server through the first communication unit.

16. The non-transitory readable medium of claim 14, further comprising:
- installing, at the second client device, the customized configuration file;
- storing, in a second memory of the second client device, network configuration information associated with the wireless network when the customized configuration file is installed; and
- connecting to the wireless network automatically through a second communication unit of the second client device after the second client device installs the customized configuration file.

17. The non-transitory readable medium of claim 14, further comprising creating, by the processing unit of the server, the customized configuration file using a connection expiration period, wherein the customized configuration file limits a connection of the second client device to the wireless network to the connection expiration period.

* * * * *